United States Patent [19]

Cable

[11] Patent Number: 4,599,740
[45] Date of Patent: Jul. 8, 1986

[54] RADIOGRAPHIC EXAMINATION SYSTEM

[76] Inventor: Arthur P. Cable, 181 Sumatra Rd., London NW6 1PP, England

[21] Appl. No.: 772,144

[22] Filed: Sep. 3, 1985

Related U.S. Application Data

[63] Continuation-in-part of Ser. No. 456,111, Jan. 6, 1983, abandoned.

[51] Int. Cl.$^4$ .............................................. G01N 23/04
[52] U.S. Cl. .......................................... 378/57; 378/99
[58] Field of Search ............................. 378/57, 58, 99; 358/111

[56] References Cited

U.S. PATENT DOCUMENTS

| | | | |
|---|---|---|---|
| 3,884,816 | 5/1975 | Takahashi | 378/57 |
| 3,924,064 | 12/1975 | Nomura | 378/57 |
| 4,092,537 | 5/1978 | Stewart | 378/58 |
| 4,366,382 | 12/1982 | Kotowski | 378/57 |
| 4,430,568 | 2/1984 | Yoshida | 378/57 |

*Primary Examiner*—Craig E. Church
*Attorney, Agent, or Firm*—Gifford, Groh, VanOphem, Sheridan, Sprinkle & Dolgorukov

[57] ABSTRACT

A radiographic examination system for performing X-ray examination of large items such as International container units is formed as an installation comprising housings for one or a plurality of X-ray sources such as linear accelerators which in operation transmit a continuous beam of radiation across a conveyor along which the units to be inspected are displaced either continuously or incrementally. The radiation transmitted through a container is detected in a folded sensor screen or array extending on one side and over the position occupied by a container under inspection. The sensor screen or array produces optical signals which are converted into electrical signals by a photo-diode array or a camera system such as a television camera, and transmitted as pulse coded electrical signals by a coding transfer unit to display screens and signal recording equipment where an image of the transmitted information can be displayed and/or recorded for further use.

11 Claims, 5 Drawing Figures

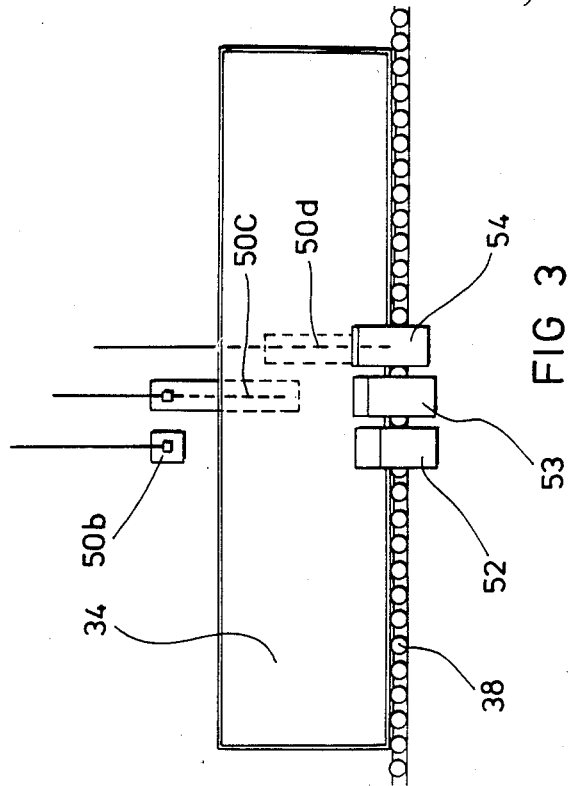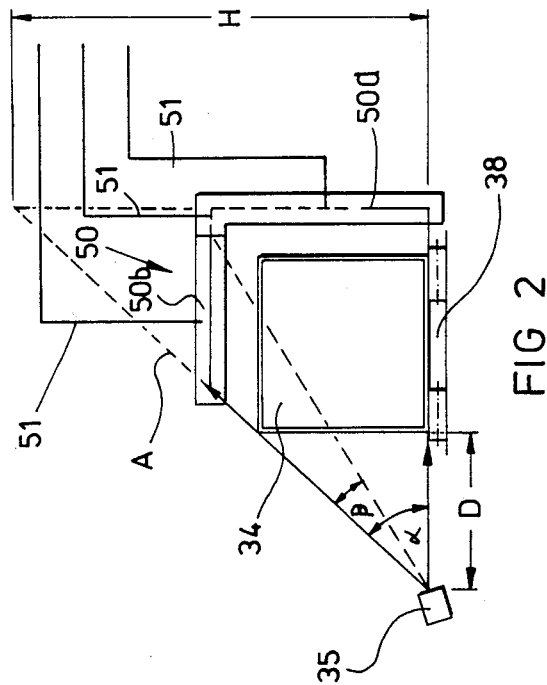

RADIOGRAPHIC EXAMINATION SYSTEM

BACKGROUND OF THE INVENTION

This is a continuation in part of U.S. patent application Ser. No. 456,111 filed Jan. 6, 1983 now abandoned.

The requirement for increasing mechanisation in the transportation of goods has led in recent years to the introduction of standardised container units which can be moved individually by road or on the trailers of articulated lorries, and which can be stacked regularly within the holds of ships to maximise the utilisation of space. Such containers are loaded and closed at their departure point and provide the not inconsiderable advantage of being relatively inviolate such that loss of contents due to misplacement of the goods (or pilfering) is substantially reduced. Although the enclosure of goods within such containers to make them inaccessible is an advantage in some respects, it also means that supervision of the movement of goods for customs and excise purposes, and for verification of the contents by the appropriate Authorities at ports and land border posts is made more difficult. This is particularly troublesome if the containers are packed with a large quantity of rather small items, because the unpacking of such a container (and these can be up to 40 feet long and 8 feet width and height) creates substantial logistical problems.

Problems of investigating the interior of otherwise closed containers or items which for one reason or another cannot be opened have arisen in other situations.

In order to gain information about components within a closed environment and at an inaccessible location it is known to use electromagnetic radiation of an appropriate wavelength which can be propagated through the material of the items under investigation. One example of this is in the radiographic examination of the interior of the human body; this has been widely employed for some considerable time, and the techniques used for diagnostic and prophylactic purposes, as well as for medical research, are well developed and widespread. Images generated by such techniques are formed on fixed film receptors and the subject for exposure is placed between an X-ray source and such receptor. A similar technique is used for examining the quality of welds of steel components where the welding is to be subject to high stresses or where the circumstances of use, such as in nuclear reactor or for use in space, must be certain not to fail during the lifetime of the equipment. Linear accelerators have been used to generate X-rays to be transmitted through the welded components. Again, fixed film exposure of the transmitted radiation is used to provide optically detectable images.

Similar X-ray techniques are also known for the examination of hand baggage at Airport security control stations where, however, instead of or as well as photographic film, a fluoroscopic screen is used to provide an immediate image of the information generated by transmitted X-rays through the hand baggage.

U.S. Pat. No. 4,366,382 discloses an X-ray line scan system for use in such baggage inspection apparatus. This system employs a fan shaped X-ray beam which scans baggage on a conveyor belt and produces images of the contents of the baggage on a video monitor. The output of an X-ray source is collimated into a narrow linear beam and objects to be scanned are exposed to this beam with successive "slices" of the object being so exposed as the conveyor moves the object past the beam. After it has passed through the object the beam impinges on a fluoroscopic screen which emits a light pattern in accordance with the characteristics of the objects being scanned. This light output is received by an array of photodetectors which generate electrical signals in accordance with the intensity of the light received thereby. The outputs of the photodetectors are sequentially sampled to provide a series of signals in accordance with the photodetector outputs and these signals are converted to digital form and stored in a memory. The output of the memory is fed through appropriate video output circuits to a video monitor where an image of the object being scanned is displayed. Here, the array of photodetectors is a single line array orthogonal to the nominal "axis" of the fan shaped beam. Moreover, the X-ray source is positioned above the conveyor on which the articles to be inspected are conveyed and the detector array is positioned below this conveyor.

In U.S. Pat. No. 4,430,508, on the other hand, an X-ray section system is adapted for the automatic inspection of the contents of packages such as containers especially large containers such as those carried on ships, without opening or unpacking the containers. An X-ray transmitter generates a fan shaped beam which is directed laterally at the container as it passes. A single line array of sensors is positioned on the side of the conveyor remote from the X-ray source to receive the fan shape beam after it has passed through the container. Again, only a single straight line array is employed so that this array must be significantly higher than the containers being examined in order to intercept the part of the fan shape beam passing through the upper corner of the container nearest the transmitter. This is a considerable disadvantage when it is considered that the containers in question may be up to 8 foot high so that the linear sensors of such a system must be up to 10 or even 12 feet high in order to receive all the necessary impinging radiation. There is a trade off in sensor array height, of course, by moving the X-ray generator further from the container, although since the intensity of the X-radiation follows the inverse quare law the further the transmitter is placed from the container the lower the intensity will be for a given initial energy of the X-ray source.

OBJECTS OF THE INVENTION

The main object of the present invention is that of providing a radiographic examination system which is particularly adapted for the repeated examination of large items such as containers.

Another object of the invention is to provide a radiographic examination system of great accuracy and occupying a smaller space than was hithertofore possible with X-ray scanning systems of the prior art, particularly the prior art discussed above.

Yet another object of the present invention is to provide a system for the examination and verification of the contents of goods traffic containers, which will be particularly useful for customs authorities, port authorities, border posts, security services and similar groups in charge of the supervision of goods movement at critical points, particularly for the verification of the contents of such containers for avoiding the movement of contraband or illegal goods.

A further object of the present invention is to provide a system enabling radiographic examination of large containers such as the Internation container units used for the International transport of goods to be effected safely and accurately using X-rays within an energy range sufficient to produce clear images of the contents of the container even when of a widely different nature.

Still a further object of the present invention is to provide a radiographic examination system using a linear accelerator which will permit customs authorities or the like to examine the contents of the containers of any sort for the purpose of comparing the contents displayed on imaging screens and stored in memories, with written descriptions thereof such as bills of lading, without it being necessary to open the containers unless the radiographic examination reveals suspicious discrepancies between the apparent contents and the written description thereof.

SUMMARY OF THE INVENTION

According to one aspect of the present invention a radiographic examination system for examining the contents of container units, in which container units to be examined are positioned between a high energy radiation source and radiation detection means, comprises a high energy radiation source of X-rays, collimator means for producing a beam of X-ray radiation having two substantially parallel sides for transmotion through said container unit, X-ray radiation detector means incorporating one of a fluorscopic screen and a photodiode array operated directly or indirectly to product optical signals from said transmitted radiation beam of X-rays detected thereby, said X-ray radiation detector means including first and second linearly extended sensor elements or arrays, said first sensor element or array lying in a first plane at a first angle to the axis of said transmitted radiation beam of X-rays and said second sensor element or array lying in a second plane at a second angle to said axis of said transmitted radiation beam of X-rays, display means at a location remote from said radiation detection means, means for transmitting said electrical information signals from said X-ray radiation detector means to said display means, said display means incorporating a screen for displaying said information signals from both said first and said second sensor elements or arrays as a composite optical image for visual inspection and one of photographic recording apparatus and electronic recording apparatus for recording said information signals displayed on said screen.

By virtue of the provision of the said two sensor elements or arrays an effectively "folded" sensor is formed which, in the lateral impingement configuration naturally employed for inspecting large container units, that is with the X-ray source positioned to one side of a conveyor for the container units, enables the system to be built to a smaller height than would otherwise be necessary in order to obtain a clear picture throughout the whole of the container thickness. Such a "folded" sensor can be positioned with a vertical or upright element or array on the side of the container remote from the X-ray source, and a second, generally horizontal or inclined sensor element or array located above the container for receiving X-rays transmitted through the front face of said container and out through the top of the container from an X-ray source positioned to one side.

Because of the scale of International container units it is necessary to use extremely high energy radiation in order to generate satisfactory images and repeated narrow scans of the containers must be made in order to generate the overall images. For this reason display systems able to provide a recording function are necessary so that a single final image generated by an extended scan can be obtained. The scanning and display take place at what appears to be a simultaneous condition, but in reality the image produced is a pseudo real time image built up from a plurality of successive scans of the unit.

Radiographic examination of large containers can be undertaken utilising the system of the present invention to enable simple and speedy identification of the contents thereof to be obtained. Advantageously, therefore, the presence of possible contraband goods mixed with normal merchandise can be identified readily so that suspect containers can be isolated for conventional visual inspection after opening.

In a preferred embodiment of the invention the radiation source is a linear accelerator generating X-rays in the MeV range and the primary detectors may include fluoroscopic screens or photodiode arrays which produce optical signals and/or electrical signals. If fluoroscopic screens are employed the optical signals produced thereon must be converted to electrical signals for transmission to the remote display for safety of the operators in view of the high energy X-rays in the scan. Such conversion can be effected by means of a photosensitive diode array or by a television camera which must be kept out of the penumbra of the X-ray beam because of the image deteriorating effect of stray radiation.

The image produced on the primary sensors is created by interposing the container or other subject under examination between the radiation source and the sensors; such image therefore represents a radiation "shadow" of the subject exposed to radiation. An important feature of the present invention lies in the fact that the sensors and electronic circuitry and components for generating electrical signals representing the image to be displayed eventually on the screens for the operators to examine, are subject to continual recalibration and analysis of operating state in order to allow a continuous X-ray beam to be employed where in the prior art pulsed X-rays were utilised so that there would be periods of X-ray inactivity during which electronic processing could be undertaken without the deteriorating effect of stray radiation therefrom. Temporal and spatial non linearities in the operation of the circuitry, particularly diode arrays used therein, can thus be compensated utilising the principles of the present invention as defined in the claims apended hereto.

In the transmission of electrical signals from the primary sensors to the display means a pulse coded modulation of signals is preferably used for the transmission to a remote viewing location where suitable receivers convert the coded electrical signals into an optical display on a screen. Pulse code modulation of information signals is a well known technique thoroughly familiar to those skilled in the art and for this reason the details of the pulse code modulation, the modulators and the de-modulators and associated circuitry will not be discussed in detail herein. Image intensifiers operating on the electrical signals can also be used to improve the perceived quality of the image to facilitate ready identification of the content of the containers under examination.

The coded electrical signals may also be recorded electromagnetically for storage and/or for subsequent play back to generate optical images for comparison with images produced during a subsequent scan of the subject under investigation.

In many prior art radiographic examination systems, particularly those for investigating the quality of welded joints, it has been usual to provide a motorised yoke and overhead bridge crane for positioning the X-ray source with respect to the subject under investigation. This has meant that the relative positioning of the X-ray source, the object under investigation and the target sensors have presented considerable problems in obtaining accurate location. The present invention seeks to overcome such difficulties by providing relatively fixed positioning of the linear accelerator and the detectors, and by displacing the items under investigation into position between them using a suitable heavy duty conveyor which is nevertheless capable of positioning the containers for investigation accurately between the X-ray source and the detectors.

The containers can be carried on self-aligned roller table systems, operating in conjunction with fixed chain link conveyors for displacement past the X-ray source and detector system. The roller table systems permit the containers to be moved forwardly from a storage area to the inspection point and may be provided with lateral drag chains and dogs for side movements of the containers if and when it is required to displace these from longitudinally transporting conveyors, for example for re-check, for transfer to another parallel line, or for displacement to a visual inspection area where the container is to be opened.

The roller tables may be formed from a plurality of individual rollers each having a length of up to 3.5 m for effecting the main forward and reverse movements of containers from loading point, through a storage region to the inspection point, and from the inspection point to a backup storage point and a cleared collection and despatch area.

The invention will be better understood from a consideration of the following detailed description with reference to the accompanying drawings which illustrate various preferred embodiments of the invention.

BRIEF DESCRIPTION OF THE DRAWINGS

FIG. 2 is a schematic sectional side view of an X-ray system employing the principles of the present invention;

FIG. 3 is a side view of a different embodiment of scanning X-ray system for containers;

DESCRIPTION OF THE PREFERRED EMBODIMENTS

Figure 1:
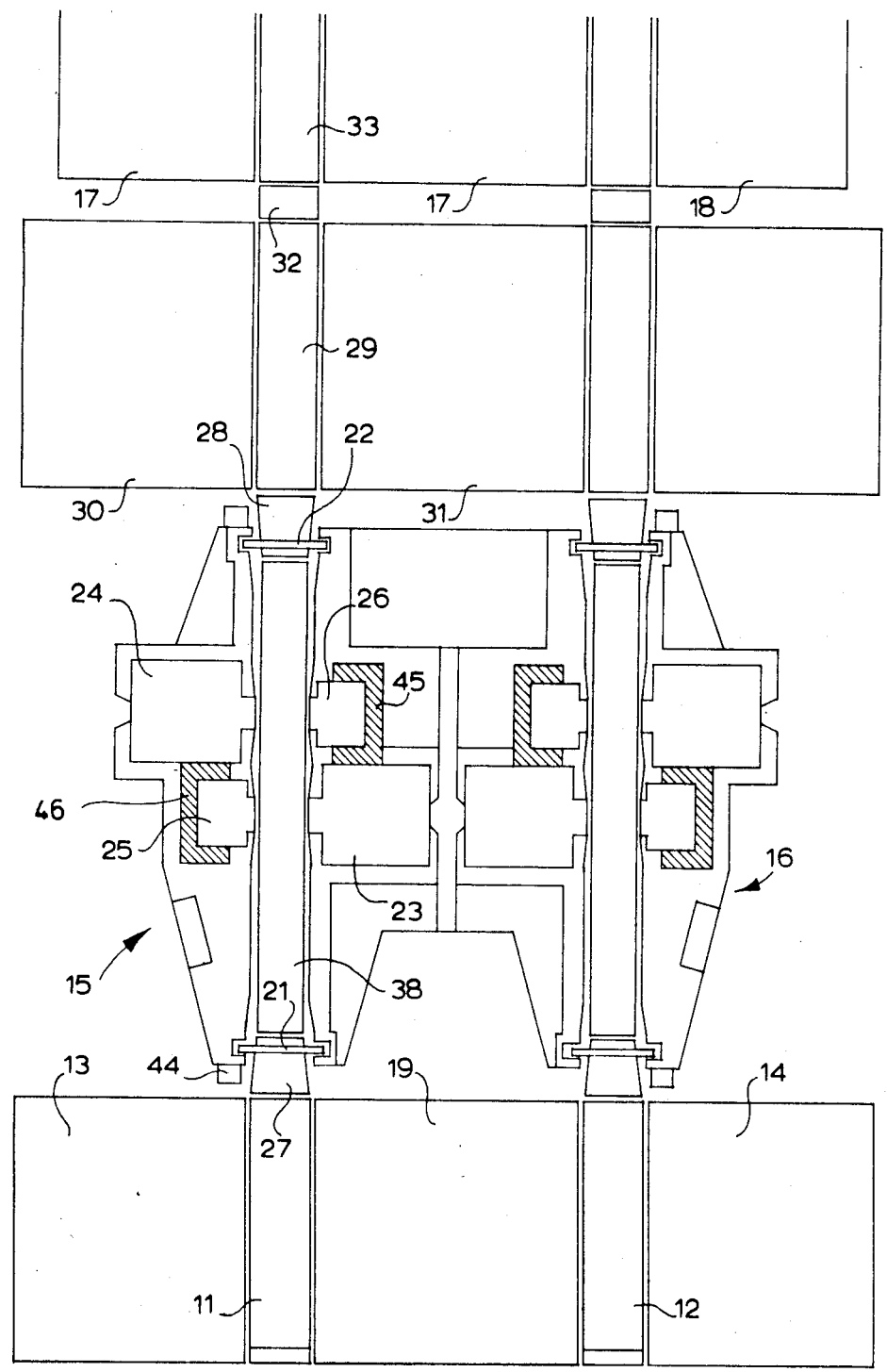
FIG. 1 is a schematic plan view of an installation incorporating the radiographic examination system of the present invention.

Referring now to FIG. 1 of the drawings, the installation shown comprises two examination lines generally indicated 11, 12 for conveying containers from respective initial delivery and/or storage areas 13, 14 through respective radiographic examination stations 15, 16 to respective output or despatch areas 17, 18.

Each of the radiographic examination systems on the two lines 11, 12 is identical and consequently only one will be described in detail herein. Between the two initial delivery and/or storage areas 13, 14 is a container turn around area 19 housing a turn around crane or other conventional handling apparatus which, together with lateral transfer means (not illustrated) enables a container to be transferred laterally from one conveyor line to the other and at the same time turned around if required so that upon transfer from one line to the other the container can be passed through the investigation unit facing in the opposite direction.

From the input conveyor line 11 containers pass across a short roller conveyor table 27 and through motorised main entrance doors 21 onto a main inspection conveyor 38 which conveys them through the high energy part of the installation to an exit door 22, an exit roller table 28 and a further roller conveyor 29 which transports the containers past a re-check area 30 on one side and an intermediate hold area 31 on the other. A short junction roller table 32 then transfers the containers from the intermediate roller conveyor 29 to a final output conveyor 33 from which the containers can be displaced laterally to despatch areas 17, 18.

The rollers on the input section 27 are tapering single grooved rollers which act accurately to centre a container as it is transmitted so that it is accurately positioned as it enters the main conveyor 38 which carries it past the X-ray scanning station to be described in more detail below.

Along the conveyor line 38 there are positioned two accelerators for generating X-rays, each housed in a respective accelerator chamber 23, 24 positioned one on each side of the conveyor 38 and displaced from one another along the length of the conveyor. Opposite the accelerator chamber 23 is a detector chamber 25 which has a heavy massive concrete protection wall 46 for absorbing X-rays generated by the accelerator in the chamber 23. Likewise, opposite the chamber 24 is detector chamber 26 protected by massive concrete shielding walls 45. The two X-ray scanning systems can be used together, to scan in both directions through a container, or may be used in an alternative mode with the second scanning system being used as a back up in case of failure or at times of routine maintenance for the other system. Assitionally, a third accelerator (not shown) could be mounted above the roller conveyor 38 with suitable detectors mounted beneath this conveyor to provide a vertical axis beam to supplement the horizontal axis beams generated by the accelerators mounted in the chambers 23 and 24.

The system also incorporates safety interlock on the X-ray sources in the accelerator chambers to ensure that the scanning X-ray beam is only generated when the accelerator is aligned along the centre line and pointing from the accelerator housing 23 or 24 towards the detector housing 25 or 26 with their respective high density concrete shielding 46, 45. Additional safety precautions to ensure that all personnel are outside the high energy area likely to be irradiated upon energisation of the X-ray generators are also required. These safety precautions are supervised by operators in control consols 44 placed close to the main entrance doors 21 so that supervising personnel can maintain a constant surveillance over the danger area to ensure that any repair or maintenance staff have vacated the premises before the high energy electromagnetic radiation is generated in operation of the device.

Turning now to FIG. 2, there can be seen a container 34 carried on the scan station roller table 38 past an accelerator 35 in one of the accelerator chambers, for example the chamber 24. On the side of the conveyor 38 remote from the accelerator 35 is placed a detector array generally indicated 50 which, in this embodiment, is constituted by an array of scintillator crystals each associated with a respective photodiode for converting X-ray energy instant on the detector into electrical signals representative thereof. The output from the detector array 50 is taken from a plurality of output lines generally indicated 51 which lead to the electronic processing circuits illustrated in more detail in FIG. 5.

As can be seen in FIG. 2 the accelerator 35 includes a collimator which allows a fan-shape beam of X-rays to be emitted towards the container 34. This fanshape beam has substantially flat parallel vertical sides and a vertical divergence angle $\alpha$ in the region of 52.5°. The divergence angle $\alpha$ determines the spacing D from the source to the front face of the container 34 and obviously the greater the angle $\alpha$ the shorter the distance D given that the whole of the front face of the container 34 must be irradiated. In practice the wider the angle $\alpha$ the greater the intensity variation across the beam width, this being greater near the centre of the beam and falling away towards the edges. For this reason the maximum beam divergence angle $\alpha$ is limited to not greater than 60° and the figure of 52.5° mentioned above is considered an optimum. At smaller divergence angle, although the beam intensity is more uniform across its width the distance D must be increased in order to ensure that the whole of the front face of the container 34 is irradiated, and this means that the effective beam intensity is reduced since this reduces according to the inverse square law with distance from the source. By placing the accelerator 35 close to the container 34, however, it means that the upper edge of the "front" face of the container 34, that is the face nearest the accelerator 35, subtends a greater angle to the horizontal at the source so that if the direction of incident radiation is projected beyond the corner, as indicated by the line A in FIG. 2, the height of a detector array needed to receive all such radiation, even if placed closely behind the container 34, would be the height H as shown on FIG. 2. Such a detector height is a disadvantage and this problem is overcome in accordance with the present invention by providing a "folded" detector array having a first section 50a extending vertically alongside the container 34 and a second section 50b extending horizontally above the container 34 to a forward point where it is intersected by the upper ray A of radiation emitted by the accelerator 35. Electrical signals generated by the individual sensors of the two arrays 50a, 50b are processed in order to generate the eventual image of the contents derived as a result of the different attenuation of the X-rays passing through the container 34 and impinging on the detectors in the arrays 50a, 50b. As will be described in more detail below the individual detectors of the arrays 50a, 50b are compensated for the fact that the path length of the X-rays through the container 34 is different for different parts of the detector array. Thus, for example a detector spaced towards the front of the array 50 will receive X-rays having passed only through a short path in the upper left corner of the container 34 ( as viewed in FIG. 2) whereas a detector near the centre of the vertical array 50a will receive X-rays having passed through the whole thickness of the container 34 and will thus be subjected to greater attenuation even if the material through which it has passed is exactly the same as that through which the upper ray discussed above has passed.

The configuration of the detector arrays 50a, 50b also provides the added benefit that the X-rays pass through a shorter free air path to the upper detector array 50b than they would if this were a vertical continuation of the array 50a, and the perturbations introduced by dust etc., in the air can cause significant errors. This benefit of a short air path is also gained over the distance D between the accelerator 35 and the front face of the container 34.

In FIG. 3 there is shown a scanning system in which the detector array 50 is separated into three parts, the horizontal part 50b over the top of the container 34 being exactly as in the embodiment of FIG. 2, but the vertical part 50a being split into an upper and lower vertical part indicated respectively with the reference numerals 50c and 50d. Further, the three detector sections are offset from one another along the length of the container 34 on the conveyor 38 and each is aligned with a respective X-ray generator 52, 53, 54. The advantage of such a system can be appreciated by referring back to FIG. 2 where it will be seen that the angle $\beta$ subtended by the horizontal section 50b at the X-ray source is approximately one third of the angle $\alpha$ subtended by the whole detector array. Each X-ray generator 52, 53, 54 can thus be designed to generate a fanshape X-ray beam with a divergence angle 62 to scan the respective detector array 50b, 50c, 50d and the signals from these three detector arrays are then suitably combined with compensation for their axial separation being automatically introduced by the electronic circuitry. Since the container 34 is continuously scanned past the detector station the necessary compensation for the axial separation is not difficult to achieve.

Figure 4:
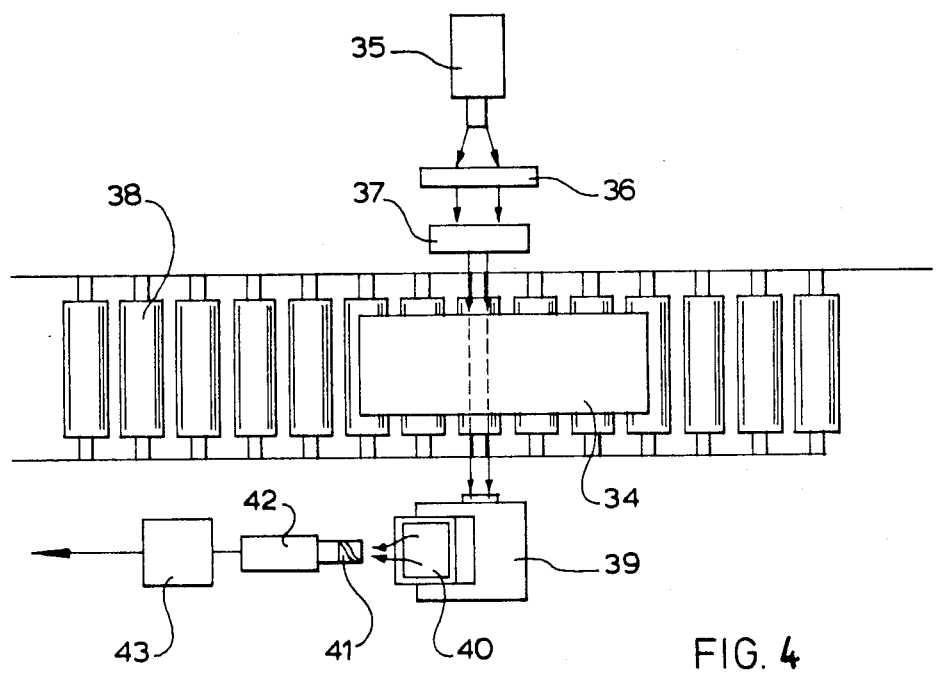
FIG. 4 is a schematic plan view of a further alternative X-ray scanning system.

FIG. 4 shows an alternative scanning system in which, in advance of the accelerator 35, a collimator 36, and beam flattening filter 37 are specifically illustrated (these components being incorporated within the housing of the X-ray source 35 illustrated in FIG. 2 or the sources 52, 53, 54 illustrated in FIG. 3. The detector system of the embodiment of FIG. 4 comprises a fluoroscopic screen 40 which produces an optical image from the received X-ray radiation. A prism 41 transmits light from the fluoroscopic screen 40 to a camera system 42 which is located to one side of the beam and well out of the penumbra of the transmitted radiation beam. This is necessary to avoid interference between the high energy electromagnetic radiation transmitted by the linear accelerator and the lower energy electromagnetic radiation constituting the light emitted by the fluoroscopic screen and to which the camera system 42 is sensitive. Again, this is necessary because a continuously operating X-ray source is utilised where, in the prior art, pulsed X-ray sources have been employed in order to try to overcome this problem.

The output from the camera 42, in the form of electrical signals, is transmitted to a pulse coding unit 43 from which the signals are transmitted away from the dangerously high energy level area within the detector housing 26 to a suitable operator console and supervision chamber 44 remote from the detector housing. Pulse code modulation techniques are well known to those skilled in the art and the details of the circuitry used need no further explanation here.

The camera system 42 is one including an electronic tube similar to a television camera system but using a "novecon" or similar type of tube capable of low level light detection and high definition. Such cameras cannot be placed directly into a high energy X-ray beam nor in an area too close to the penumbra of the beam as mentioned above in order to avoid electromagnetic interaction and interference from distorting or even entirely destroying the images produced by the camera. It should be appreciated that the fluoroscopic screen extends both alongside and above the container 34 in an array similar to that illustrated in section in FIG. 2, but the horizontal, upper section of the screen has been omitted for clarity in FIG. 4.

Figure 5:
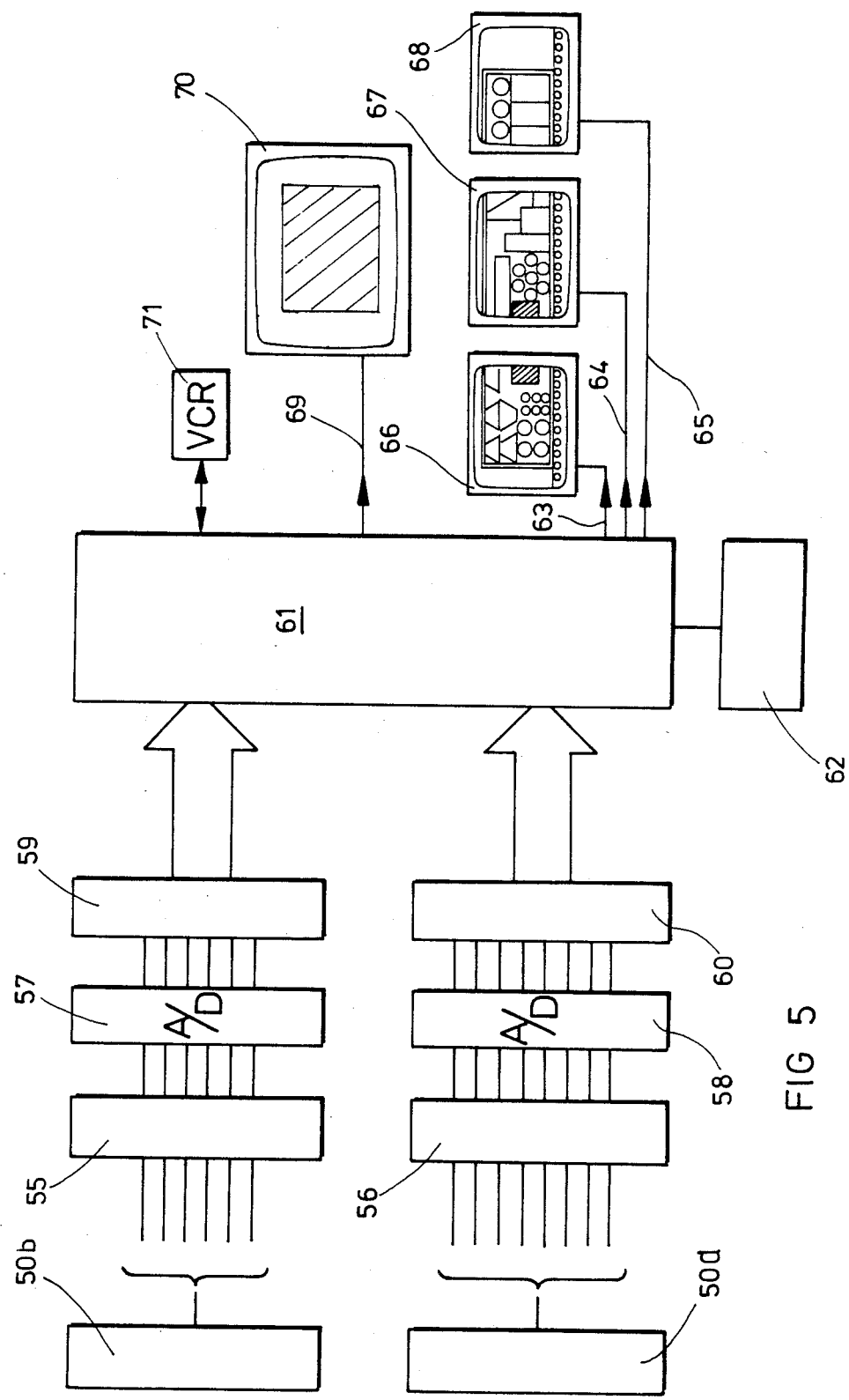
FIG. 5 is a block diagram illustrating the major electronic components of a system incorporating the features of the present invention.

FIG. 5 schematically illustrates the main blocks of the electronic circuit. In the diagrams of FIGS. 2 and 3 the outputs from the sensor arrays 50a, 50b, 50c or 50d are shown as a single line, although it will be appreciated that in practice a separate line is required for each individual sensor of array. The circuit of FIG. 5 is adapted to receive signals from the two-part sensor array 50a, 50b of FIG. 2 and includes two channels having respective sets of amplifiers 55, 56, one for each line of the signal output from the sensor arrays 50a, 50b and the output from each of the amplifiers 55, 56 is fed to a respective analogue-to-digital converter in each of two arrays thereof indicated 57 and 58. Up to this point in the circuit the signals from the sensors 50a, 50b are all in parallel with one another representing one transverse "slice" through the container and for further processing these have to be serialised in the parallel-to-serial converters 59, 60 the outputs of which are thus in the form of a serial train of digital words fed to the composing processor 61 which incorporates a memory store for all the signals, as well as control logic, address coder and decoder and other signal shaping and processing circuitry for modifying the signals in accordance with requirements. The composing processor 61 can be controlled via a keyboard 62 and produces output television signals on three lines 63, 64, 65 leading to respective television monitors 66, 67, 68 each of which displays a part of the overall "view" of the container 34 as it passes the X-ray scanning equipment. A further output line 69 from the composing processor 61 leads to a zoom monitor 70 which, under the control of the keyboard 62, can display signals selected from any region of interest and on an enlarged scale. Since the signals generated from the sensors 50a, 50b are detected at full scale they are effectively reduced to display on the monitors 66, 67, 68 and correspondingly enlargement to display on the zoom monitor 70 does not involve any loss of definition. If upon monitoring there is an area of uncertainty or one which requires specific scrutiny this can be controlled by the keyboard 62 (which may include a joystick-type controller for two-dimensional control of the enlarged picture area displayed on the monitor 70) which can then be subjected to more particular scrutiny before any decision is taken as to whether the container should be opened for visual inspection.

What is claimed is:

1. A radiographic examination system for examining the contents of container units, in which container units to be examined are positioned between a high energy radiation source and radiation detecting means, said examination system comprising:

a high energy radiation source of X-rays, a collimator means for producing a substantially parallel sided beam of radiation from said X-rays for transmission through said container unit, X-ray radiation detector means, said X-ray radiation detector means operating directly or indirectly to produce electrical signals from said transmitted radiation beam of X-rays detected thereby, said X-ray radiation detector means including first and second linearly extending radiation sensitive means, said first radiation sensitive means lying in a first plane and at a first angle to the axis of said transmitted radiation beam of X-rays and said second radiation sensitive means lying in a second plane at a second angle to said axis of said transmitted radiation beam of X-rays, a display means at a location remote from said radiation detection means.

means for transmitting said electrical signals from said X-ray radiation detector means to said display means, said display means incorporating electronic processor means and at least one screen for displaying said information signals from both said first and said second radiation sensitive means as a complete optical image for visual inspection, and one of photographic recording apparatus and electronic apparatus for recording said information signals displayed on said screen.

2. The radiographic examination system of claim 1, wherein said first radiation sensitive means extends substantially vertically alongside the path to be followed by containers past said X-ray radiation source, and said second radiation sensitive means extends generally horizontally above said path of said containers past said X-ray source, said signal processor means operating to combine signals from said first and second radiation sensitive means whereby to generate a single composite image representative of the contents of a said container.

3. The radiographic examination system of claim 2, wherein said first and said second radiation sensitive means each comprise an array of photodiode sensor elements each said photodiode sensor element comprising a scintillator element sensitive to incident X-ray radiation and operative in response thereto to produce an optical output signal, and a photodiode sensitive to said optical output signal and operative in response thereto to produce an electrical signal representative thereof.

4. The radiographic examination system of claim 1, wherein there are provided a plurality of screens for displaying a composite image representing the contents of the whole container subject to examination.

5. The radiographic examination system of claim 1, wherein the said first and said second radiation sensitive means of said X-ray radiation detector means comprises first and second fluoroscopic screens producing optical images from the incident X-ray radiation, and said means for transmitting electrical information signals from said X-ray radiation detector means to said display means includes camera means operating to convert said optical signals into electrical signals, said camera means being positioned out of the penumbra of said X-ray radiation beam.

6. The radiographic examination system of claim 1, wherein there are provided means for modulating said electrical signals with a pulse code modulation to transmit said information from said X-ray radiation detector means to said display means where said display means convert said coded electrical signals into an optical display on a screen.

7. The radiographic examination system of claim 1, wherein there are further provided electromagnetic storage means for storing said electrical signals and electronic processor means for delivering said stored electrical signals to said display means under the control of selective control means.

8. The radiographic examination system of claim 1, wherein there are provided heavy duty transport conveyors for positioning said containers for investigation between said X-ray radiation source and said X-ray radiation detector means.

9. The radiographic examination system of claim 1, wherein said X-ray radiation detector means and said radiation source are movable over a limited range for fine positioning with respect to a container under investigation.

10. The radiographic examination system of claim 1, wherein there are provided a plurality of high energy radiation generators spaced along a path defined by conveyor means for said containers and a corresponding plurality of X-ray radiation detector means spaced along the said container path in alignment with a respective said high energy radiation source both longitudinally of and transversely of said path, each said radiation source including collimator means limiting the beam of X-ray radiation emitted by said source to a fan-shape beam having substantially parallel sides and a divergence angle less than that subtended by the whole of the container at the point of emission of each said X-ray radiation beam from each said high energy source.

11. The radiographic examination system of claim 1, wherein said means for transmitting said electrical information signals from said X-ray radiation detector means to said display means include analogue-to-digital converters operating to convert analogue input signals from said detectors to digital signals, parallel-to-serial converters connected to the output of said analogue-to-digital converters for converting said digital signals arriving in parallel to a sequential series of said digital signals, and memory means storing all said digital signals from successive scans by said X-ray radiation detector means as said container moves therepast, whereby to generate, in successive instants of time, successive images on said screen representing said container in successive positions as it is moved past said X-ray radiation detector means.

* * * * *